(12) United States Patent
Masuyama et al.

(10) Patent No.: US 10,099,821 B2
(45) Date of Patent: Oct. 16, 2018

(54) METHOD FOR MANUFACTURING A MEDICAL RUBBER CLOSURE

(71) Applicant: SUMITOMO RUBBER INDUSTRIES, LTD., Kobe-shi, Hyogo (JP)

(72) Inventors: Yoshikazu Masuyama, Kobe (JP); Katsushi Maeda, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 376 days.

(21) Appl. No.: 14/854,259

(22) Filed: Sep. 15, 2015

(65) Prior Publication Data

US 2016/0075485 A1 Mar. 17, 2016

(30) Foreign Application Priority Data

Sep. 16, 2014 (JP) ................. 2014-187915

(51) Int. Cl.
*B29C 43/18* (2006.01)
*B65D 39/00* (2006.01)
(Continued)

(52) U.S. Cl.
CPC ........ *B65D 39/0076* (2013.01); *B29C 43/021* (2013.01); *B65D 51/005* (2013.01); *B29K 2007/00* (2013.01); *B29K 2009/00* (2013.01); *B29K 2023/0683* (2013.01); *B29K 2023/22* (2013.01); *B29K 2995/0069* (2013.01); *B29L 2009/00* (2013.01); *B29L 2031/565* (2013.01); *B29L 2031/753* (2013.01); *B65D 2539/003* (2013.01); *B65D 2539/008* (2013.01)

(58) Field of Classification Search
None
See application file for complete search history.

(56) References Cited

U.S. PATENT DOCUMENTS

| 4,366,912 A | 1/1983 | Matukura et al. |
| 4,915,243 A * | 4/1990 | Tatsumi ............... B29C 43/146 215/247 |

(Continued)

FOREIGN PATENT DOCUMENTS

| EP | 1 020 277 A1 | 7/2000 |
| GB | 2 256 615 A | 12/1992 |

(Continued)

OTHER PUBLICATIONS

European Search Report for Application No. 15177526.9 dated Feb. 19, 2016.
Machine English translation of JP 2000-334025 A (Dec. 5, 2000).

*Primary Examiner* — Edmund H Lee
(74) *Attorney, Agent, or Firm* — Birch, Stewart, Kolasch & Birch, LLP

(57) ABSTRACT

A medical rubber closure according to the present invention includes a disc-shaped flange portion and a leg portion formed to be continuous to a lower surface side of the flange portion, and a region at the lower surface side of the flange portion and the leg portion are made of a nitrile based rubber, a region at a top surface side of the flange portion is made of a butyl based rubber, and the leg portion is laminated with a coating layer made of a fluorine based resin film.

4 Claims, 3 Drawing Sheets

(51) Int. Cl.
*B65D 51/00* (2006.01)
*B29C 43/02* (2006.01)
 *B29K 23/00* (2006.01)
 *B29K 9/00* (2006.01)
 *B29L 9/00* (2006.01)
 *B29L 31/56* (2006.01)
 *B29L 31/00* (2006.01)
 *B29K 7/00* (2006.01)

(56) References Cited

U.S. PATENT DOCUMENTS

| | | | | |
|---|---|---|---|---|
| 5,217,668 | A | * | 6/1993 | Matsuzaki ............ B29C 43/146 264/161 |
| 5,288,560 | A | * | 2/1994 | Sudo .................. A61M 5/31511 428/494 |
| 5,484,566 | A | * | 1/1996 | Gabbard ............... B29C 43/146 264/250 |
| 6,165,402 | A | * | 12/2000 | Gabbard ............... B29C 43/021 264/255 |
| 6,286,699 | B1 | * | 9/2001 | Sudo ...................... B65D 39/00 215/247 |
| 9,586,737 | B2 | * | 3/2017 | Klumpen ............... A61J 1/1406 |
| 2007/0246468 | A1 | | 10/2007 | Miller et al. |
| 2013/0119011 | A1 | | 5/2013 | Kawachi |
| 2016/0075485 | A1 | | 3/2016 | Masuyama et al. |

FOREIGN PATENT DOCUMENTS

| | | |
|---|---|---|
| JP | 58-39436 A | 3/1983 |
| JP | 63-43104 B2 | 8/1988 |
| JP | 7-24338 U | 5/1995 |
| JP | 7-41065 B2 | 5/1995 |
| JP | 7-255821 A | 10/1995 |
| JP | 2816905 B2 | 10/1998 |
| JP | 10-314305 A | 12/1998 |
| JP | 2000-334025 A | 12/2000 |
| JP | 2005-297432 A | 10/2005 |
| JP | 2009-533203 A | 9/2009 |
| JP | 2013-103755 A | 5/2013 |
| JP | 2014-27980 A | 2/2014 |
| JP | 2014-79373 A | 5/2014 |

* cited by examiner

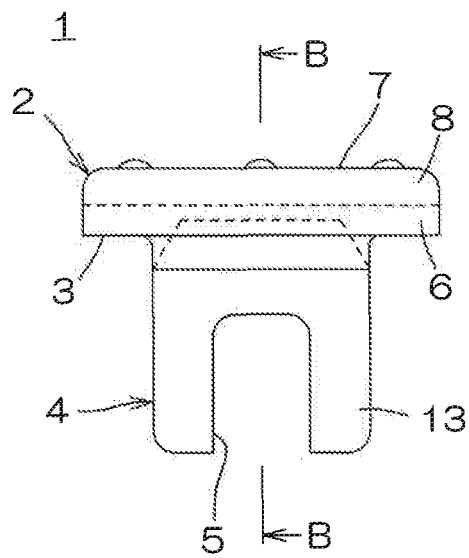
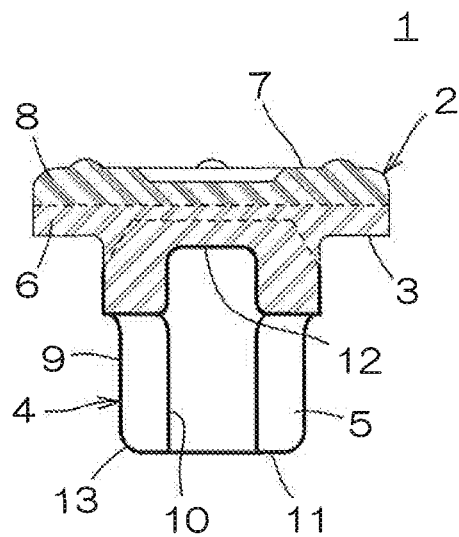
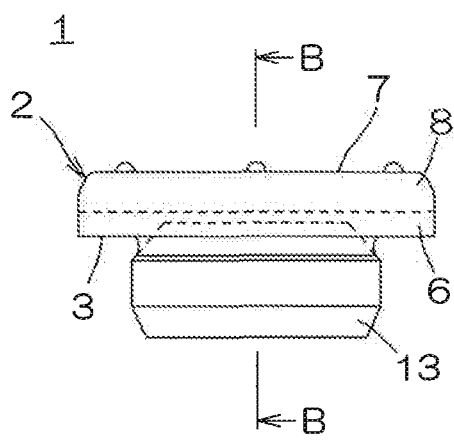
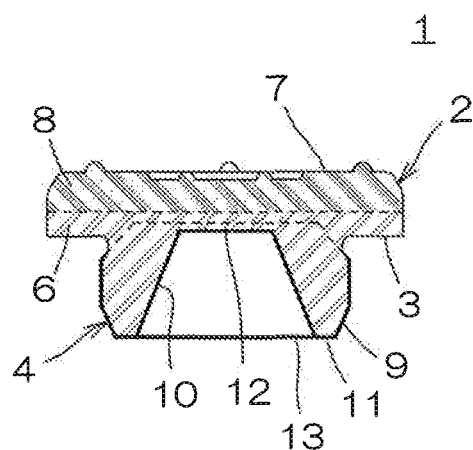

METHOD FOR MANUFACTURING A MEDICAL RUBBER CLOSURE

CROSS-REFERENCE TO RELATED APPLICATIONS

The present application corresponds to Japanese Patent Application No. 2014-187915 filed on Sep. 16, 2014 in the Japan Patent Office, and the entire disclosure of this application is incorporated herein by reference.

FIELD OF THE INVENTION

The present invention relates to a medical rubber closure suitable in particular as a closure of a container for an oil based preparation and a method for manufacturing the same.

BACKGROUND ART

As closures of vial bottles and other containers for preparations, medical rubber closures, each including, for example, a disc-shaped flange portion and a leg portion formed to be continuous to a lower surface side of the flange portion and being inserted in an opening of the container, are being widely used.

Such a medical rubber closure is generally formed of a butyl based rubber, which is excellent in moisture permeation resistance, to prevent the preparation contained in the container from deteriorating due to moisture.

However, a medical rubber closure made of a butyl based rubber is not sufficient in oil resistance and there is thus a problem that it cannot be used, for example, in a case where the preparation is oil based and oil resistance is required.

If, for example, a laminated rubber closure is arranged with which the leg portion is laminated with a coating layer made of a fluorine based resin film, etc., the oil resistance can be improved to some degree even with a rubber closure made of a butyl based rubber. However, there is a problem that when an oil based preparation infiltrates to a lower surface, etc., of the flange portion that is not laminated, the butyl based rubber swells.

Although the oil resistance can be improved, for example, by the medical rubber closure being formed of an oil resistant rubber, such as a fluororubber, fluorosilicone rubber, nitrile based rubber, etc., these oil resistant rubbers are not sufficient in moisture permeation resistance in comparison to a butyl based rubber and there is thus a problem that a sufficient effect of preventing the deterioration of the preparation by moisture cannot be obtained. Even if the leg portion of the medical rubber closure, made of a nitrile based rubber, is coated with the coating layer as described, for example, in Patent Document 1 (Japanese Examined Patent Application Publication No. 07-041065), etc., the moisture permeation resistance is still insufficient and the above problem is not resolved.

In Patent Document 2 (Japanese Examined Patent Application Publication No. 63-43104), it is proposed that the leg portion and the flange portion (closure main body) be formed of an oil resistant fluororubber and a rubber layer, made of a butyl based rubber that is excellent in moisture permeation resistance, be laminated onto the flange portion.

It is considered that with this arrangement, a medical rubber closure having both a high oil resistance due to the fluororubber and a satisfactory moisture permeation resistance due to the butyl based rubber, etc., can be formed.

BRIEF SUMMARY OF THE INVENTION

However, with the invention described in Patent Document 2, the leg portion and the closure main body are formed of a fluororubber, which is expensive, and there is thus a problem that the manufacturing cost is high.

There is also a problem that the number of steps is high because with a fluororubber, secondary vulcanization, for example, of approximately 3 to 30 minutes at 150 to 250° C. is required and, after the secondary vulcanization, a step of coating on an adhesive is required because vulcanization bonding cannot be performed, etc.

Although these problems can be resolved by using a nitrile based rubber as the oil resistant rubber in place of a fluororubber, a problem of extractable substances arises with the arrangement of the invention described in Patent Document 2 because the leg portion is exposed without being laminated with a coating layer.

That is, if the leg portion and the closure main body are formed of a nitrile based rubber that is high in extractable substances, this, together with the closure main body and the rubber layer being laminated mainly using an adhesive that is similarly high in extractable substances gives rise to a problem that a medical rubber closure of low extractable substance amount that can conform to conformity conditions of the "Extractable Substances Test" cited in "7.03 Test for Rubber Closure for Aqueous Infusions" of the Japanese Pharmacopoeia Sixteenth Edition cannot be obtained.

Although lamination of the closure main body and the rubber layer without interposition of an adhesive layer is also described in Patent Document 2, conformance to the extractable substances test is nevertheless not possible as long as a nitrile based rubber is exposed at the leg portion.

An object of the present invention is to provide a medical rubber closure, having both high oil resistance and satisfactory moisture permeation resistance and moreover being low in extractable substance amount so as to be capable of conforming to the extractable substances test specified in the Japanese Pharmacopoeia, and a method for manufacturing that enables the medical rubber closure to be manufactured with high efficiency and low cost.

The present invention provides a medical rubber closure including a disc-shaped flange portion and a leg portion formed to be continuous to a lower surface side of the flange portion and where a region at the lower surface side of the flange portion and the leg portion are made of a nitrile based rubber, a region at a top surface side of the flange portion is made of a butyl based rubber, and the leg portion is laminated with a coating layer made of a fluorine based resin film.

Also, the present invention provides a method for manufacturing medical rubber closure by which the medical rubber closure according to the present invention is manufactured through a step of vulcanization molding a sheet of unvulcanized nitrile based rubber that is to form the leg portion and a fluorine based resin film that is to form the coating layer to form a primary molded article, including the leg portion made of the nitrile based rubber and the coating layer made of the fluorine based resin film and being laminated to the leg portion by vulcanization bonding, and thereafter punching out the leg portion individually to prepare a closure blank, and a step of setting the closure blank in a secondary molding mold, overlapping thereon a sheet of unvulcanized nitrile based rubber that is to form the region at the lower surface side of the flange portion and a sheet of unvulcanized butyl based rubber that is to form the region at the top surface side of the flange portion, and performing vulcanization molding in this state to form the region at the lower surface side of the flange portion made of the nitrile based rubber and the region at the top surface side of the flange portion made of the butyl based rubber and vulcanization bonding the two regions and the closure blank to each other.

ADVANTAGEOUS EFFECTS OF THE INVENTION

By the present invention, it is possible to provide a medical rubber closure, having both high oil resistance and satisfactory moisture permeation resistance and moreover being low in extractable substance amount so as to be capable of conforming to the extractable substances test specified in the Japanese Pharmacopoeia, and a method for manufacturing that enables the medical rubber closure to be manufactured with high efficiency and low cost.

BRIEF DESCRIPTION OF THE DRAWINGS

FIG. 1A is a front view of an example of a preferred embodiment of a medical rubber closure according to the present invention.

FIG. 1B is a sectional view taken along line B-B in FIG. 1A.

FIG. 2A is a front view of another example of the preferred embodiment of the medical rubber closure according to the present invention.

FIG. 2B is a sectional view taken along line B-B in FIG. 2A.

DESCRIPTION OF EMBODIMENTS

Figure 3A:
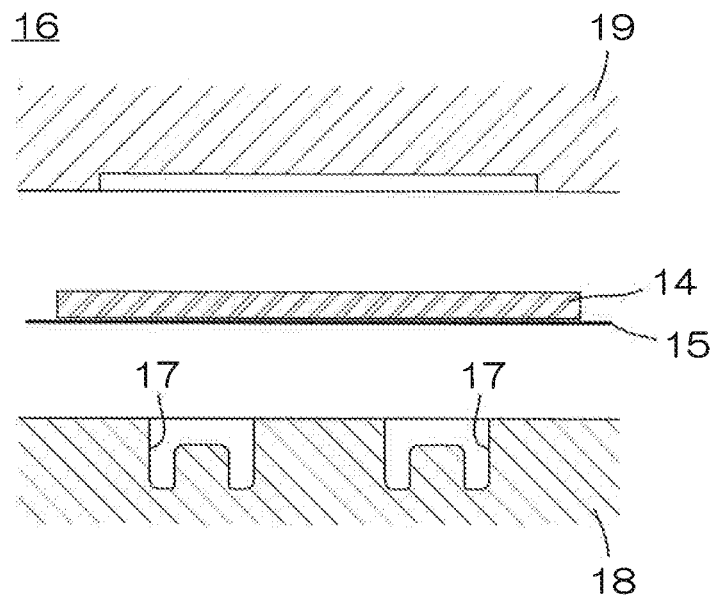
FIG. 3A to FIG. 3C are sectional views for describing respective steps of manufacturing medical rubber closures of the example of FIG. 1A and FIG. 1B by a method for manufacturing medical rubber closure according to the present invention.

FIG. 1A is a front view of an example of a preferred embodiment of a medical rubber closure according to the present invention. FIG. 1B is a sectional view taken along line B-B in FIG. 1A.

With reference to both figures, the medical rubber closure 1 of the present example includes a disc-shaped flange portion 2 and a tubular leg portion 4 formed to be continuous to a lower surface 3 side of the flange portion 2. Also notches 5 are provided at two locations in a circumferential direction of the leg portion 4.

Among portions of the medical rubber closure 1, a region 6 of the flange portion 2 further to the lower surface 3 side than an upper broken line in both figures and the leg portion 4 lower than a lower broken line in both figures are formed of a nitrile based rubber.

As the nitrile based rubber forming the leg portion 4 and the region 6, any of various nitrile based rubbers having a high oil resistance may be used. As an example of the nitrile based rubber, one type or two or more types among acrylonitrile butadiene rubbers (NBR), hydrogenated acrylonitrile butadiene rubbers (HNBR), carboxylated acrylonitrile butadiene rubbers (XNBR), acrylonitrile butadiene isoprene rubbers (NBIR), etc., can be cited.

Also among portions of the medical rubber closure 1, a region 8 of the flange portion 2 further to a top surface 7 side than the upper broken line is formed of a butyl based rubber.

As the butyl based rubber forming the region 8, any of various butyl based rubbers that are excellent in moisture permeation resistance may be used. As an example of the butyl based rubber, one type or two or more types among butyl rubbers (IIR), which are copolymers of isobutylene and isoprene, chlorinated butyl rubbers (CIIR) obtained by chlorination of the butyl rubbers, brominated butyl rubbers (BIIR) obtained by bromination of the butyl rubbers, brominated isobutylene-p-methylstyrene copolymer rubbers, which are bromination products of copolymers of isobutylene and p-methylstyrene, etc., can be cited.

Further among portions of the medical rubber closure 1, the leg portion 4, which is inserted into a vial bottle or other container and contacts a preparation, has all of its surfaces, that is, an outer peripheral surface 9, an inner peripheral surface 10, and a tip surface 11 of the tube and an innermost surface 12 of the tube, which is also a lower surface of the flange portion 2, laminated with a continuous coating layer 13 made of a fluorine based resin film as indicated by thick lines in FIG. 1B.

As the fluorine based resin film forming the coating layer 13, any of various fluorine based resin films that can be laminated onto the leg portion 4, made of the nitrile based rubber, as described above and having a function of reducing the amount of extractable substances from the nitrile based rubber may be used. As the fluorine based resin film, a film, made of a fluorine based resin, such as polytetrafluoroethylene (PTFE), tetrafluoroethylene-ethylene copolymer (ETFE), or a modified product of the above, etc., and having the one surface in contact with the leg portion 4 being surface-treated, can be cited.

The nitrile based rubber is excellent in oil resistance, and therefore by the leg portion 4, which is inserted into the vial bottle or other container and contacts the preparation, and the region 6 being formed of the nitrile based rubber, the oil resistance of the medical rubber closure 1 against an oil based preparation can be improved. Also, the medical rubber closure 1 can be manufactured at a lower cost in comparison to a case where the leg portion 4 and the region 6 are formed of a fluororubber.

Also, the butyl based rubber is excellent in moisture permeation resistance, and therefore by the region 8 at the top surface 7 side of the flange portion 2 being formed of the butyl based rubber, the moisture permeation resistance of the medical rubber closure 1 can also be improved while maintaining the satisfactory oil resistance due to the nitrile based rubber.

Further, the butyl based rubber and the fluorine based resin are low in the amount of extractable substances, and therefore, as described above, by the region 8 at the top surface 7 side of the flange portion 2 being formed of the butyl based rubber and by all surfaces of the leg portion 4 being laminated with the coating layer 13, made of the fluorine based resin film, to decrease an exposed area of the nitrile based rubber and reduce a usage amount of the nitrile based rubber with respect to the entirety of the medical rubber closure 1, the medical rubber closure 1 can be made low in extractable substance amount and capable of conforming to the conformity conditions of the "Extractable Substances Test" cited in "7.03 Test for Rubber Closure for Aqueous Infusions" of the Japanese Pharmacopoeia Sixteenth Edition.

FIG. 2A is a front view of an example of the preferred embodiment of the medical rubber closure according to the present invention. FIG. 2B is a sectional view taken along line B-B in FIG. 2A.

With reference to both figures, the medical rubber closure 1 of the present example may be arranged in the same manner as the example of FIG. 1A and FIG. 1B, with the exception that the shape of the leg portion 4 differs in accordance with the shape, etc., of an opening of the container to be combined with.

That is, the medical rubber closure 1 includes the disc-shaped flange portion 2 and the tubular leg portion 4 formed to be continuous to the lower surface 3 side of the flange portion 2.

Among portions of the medical rubber closure 1, the region 6 of the flange portion 2 further to the lower surface 3 side than an upper broken line in both figures and the leg portion 4 lower than a lower broken line in both figures are formed of the nitrile based rubber.

Also among portions of the medical rubber closure 1, the region 8 of the flange portion 2 further to the top surface 7 side than the upper broken line is formed of the butyl based rubber.

Further among portions of the medical rubber closure 1, the leg portion 4, which is inserted into a vial bottle or other container and contacts a preparation, has all of its surfaces, that is, the outer peripheral surface 9, the inner peripheral surface 10, and the tip surface 11 of the tube and the innermost surface 12 of the tube, which is also the lower surface of the flange portion 2, laminated with the continuous coating layer 13 made of the fluorine based resin film as indicated by thick lines in FIG. 1B.

By the leg portion 4 and the region 6 being formed of the nitrile based rubber as described above, the oil resistance of the medical rubber closure 1 against an oil based preparation can be improved, and by the region 8 at the top surface 7 side of the flange portion 2 being formed of the butyl based rubber, the moisture permeation resistance of the medical rubber closure 1 can also be improved while maintaining the satisfactory oil resistance due to the nitrile based rubber.

Moreover, by the region 8 at the top surface 7 side of the flange portion 2 being formed of the butyl based rubber and by all surfaces of the leg portion 4 being laminated with the coating layer 13, made of the fluorine based resin film, to decrease the exposed area of the nitrile based rubber and reduce the usage amount of the nitrile based rubber with respect to the entirety of the medical rubber closure 1, the medical rubber closure 1 can be made low in extractable substance amount and capable of conforming to the conformity conditions of the "Extractable Substances Test" cited in "7.03 Test for Rubber Closure for Aqueous Infusions" of the Japanese Pharmacopoeia Sixteenth Edition.

Figure 3B:
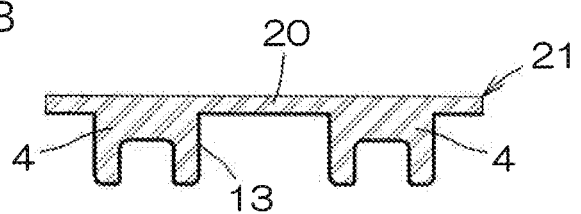
Figure 3C:
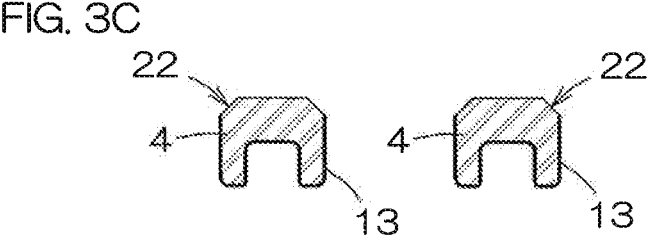
Figure 4A:
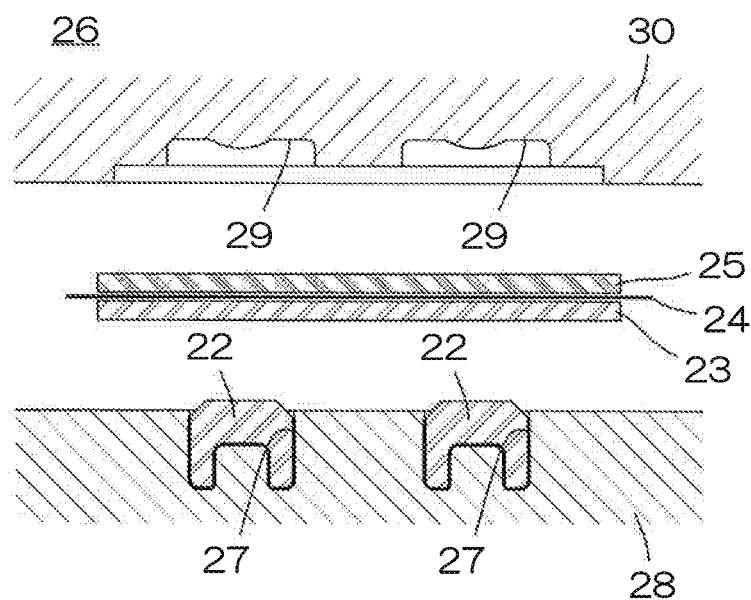
FIG. 4A and FIG. 4B are sectional views for describing steps subsequent those of FIG. 3A to FIG. 3C.
Figure 4B:
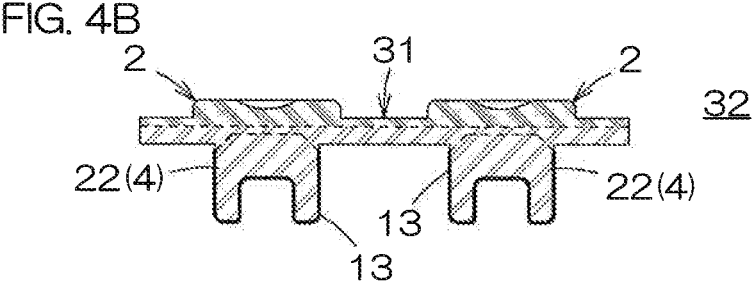

FIG. 3A to FIG. 3C are sectional views for describing respective steps of manufacturing medical rubber closures of the example of FIG. 1A and FIG. 1B by a method for manufacturing medical rubber closure according to the present invention. Also, FIG. 4A and FIG. 4B are sectional views for describing steps subsequent those of FIG. 3A to FIG. 3C.

With reference to the respective figures together with FIGS. 1A and 1B, in the manufacturing method of the present example, first, a sheet 14 of an unvulcanized nitrile based rubber that is to form the leg portion 4 of the medical rubber closure 1 and a fluorine based resin film 15 that is to form the coating layer 13 are prepared.

As the sheet 14 of unvulcanized nitrile based rubber, that with which the nitrile based rubber is blended with cross-linking components, such as a crosslinking agent, an accelerator, an accelerating assistant, etc., for vulcanizing (cross-linking) the nitrile based rubber, a filler, such as silica, clay, talc, etc., for adjusting hardness, and various additives, such as a processing aid, a softener, a colorant, etc., at suitable proportions and then kneaded and molded into a sheet may be used.

Also as the fluorine based resin film 15, a film, having the one surface in contact with the leg portion 4, that is, the sheet 14 being surface-treated as mentioned above, can be cited.

The fluorine based resin film 15, in a state where the one surface-treated surface is contactingly superposed on the sheet 14, is supplied between a lower mold 18, having a plurality of recesses 17, each corresponding to the shape of the leg portion 4, and a counterpart upper mold 19 of a primary molding mold 16 that is heated in advance to a vulcanization temperature of the nitrile based rubber [FIG. 3A].

Thereafter, the sheet 14 and fluorine-based resin film 15 are vulcanization-molded by mold-clamping the lower mold 18 and the upper mold 19 to form a primary molded article 21, with which a plurality of leg portions 4, corresponding to the recesses 17, are formed so as to be made continuous by burrs 20 and the fluorine-based resin film 15 is laminated by vulcanization bonding to form the coating layer 13 at a lower surface side that includes all surfaces of the continuously formed leg portions 4 [FIG. 3B].

The individual leg portions 4 are then punched out from the formed primary molded article 21 to prepare closure blanks 22 [FIG. 3C].

Also, apart from the above, a sheet 23 of unvulcanized nitrile based rubber that is to form the region 6 at the lower surface 3 side of the flange portion 2 of the medical rubber closure 1, a sheet 24 of ultrahigh molecular weight polyethylene, and a sheet 25 of unvulcanized butyl based rubber that is to form the region 8 at the top surface 7 side of the flange portion 2 are prepared [FIG. 4A].

Among these, as the sheet 23 of unvulcanized nitrile based rubber, the same sheet as the aforementioned sheet 14 may be used. Also, the type of nitrile based rubber used in the sheet 23 may be differed or the types, blending proportions, etc., of the crosslinking components and additives may be differed to make the hardness, etc., of the region 6 differ from those of the leg portion 4.

Although the sheet 24 of ultrahigh molecular weight polyethylene may be omitted, by interposing the sheet 24, the strength of adhesion of the region 6 made of the nitrile based rubber and the region 8 made of the butyl based rubber can be improved. Moreover, an ultrahigh molecular weight polyethylene is not high in extractable substance amount as in the case of a conventional adhesive and therefore provides an advantage that there is no possibility of increasing the extractable substance amount of the medical rubber closure 1 as a whole.

As the sheet 25 of unvulcanized butyl based rubber, that with which aforementioned the butyl based rubber is blended with crosslinking components, such as a crosslinking agent, an accelerator, an accelerating assistant, etc., for vulcanizing (crosslinking) the butyl based rubber, a filler, such as silica, clay, talc, etc., for adjusting hardness, and various additives, such as a processing aid, a softener, a colorant, etc., at suitable proportions and then kneaded and molded into a sheet may be used.

Thereafter, the respective sheets 23 to 25, in a state of being superposed successively, are supplied between a lower mold 28, having a plurality of recesses 27, each corresponding to the shape of the leg portion 4, and an upper mold 30, having a plurality of recesses 29, each corresponding to the shape of the flange portion 2, of a secondary molding mold 26 that is heated in advance to a vulcanization temperature of the nitrile based rubber and the butyl based rubber, and the closure blanks 22 prepared in the former step are set in the recesses 27 of the lower mold 28 [FIG. 4A].

Thereafter, the sheets 23 to 25 are vulcanization-molded by mold-clamping the lower mold 28 and the upper mold 30 to form a secondary molded article 32, with which a plurality of flange portions 2, corresponding to the recesses 29, are formed so as to be made continuous by burrs 31 and the closure blanks 22 (leg portions 4) are vulcanization-bonded to the lower surface of the continuously formed flange portions 2 [FIG. 4B].

Thereafter, although unillustrated, a silicone based or other lubricating coating agent is coated onto both surfaces of the formed secondary molded article 32, and when after performing an appearance inspection, the individual flange portions 2 are punched out, the medical rubber closures 1, with each of which the region 6 at the lower surface 3 side of the flange portion 2 and the leg portion 4 are made of the nitrile based rubber, the region at the top surface 7 side of the flange portion 2 is made of the butyl based rubber, and all surfaces of the leg portion 4 are laminated with the coating layer 13 made of the fluorine based resin film as shown in FIG. 1A and FIG. 1B are manufactured.

Thereafter, the manufactured medical rubber closures 1 can be made into products, for example, through respective processes of cleaning, sterilization, drying, appearance inspection, and packaging.

By the manufacturing method according to the present invention, the medical rubber closure 1 according to the present invention that has the complex laminated structure described above can be manufactured efficiently and at low cost by just performing the two steps of vulcanization molding as described above.

Obviously, the medical rubber closure of the example of FIG. 2A and FIG. 2B can also be manufactured similarly through the respective steps described above.

The thickness of the sheet 14 that is to form the leg portions 4 suffices to be set to a thickness sufficiently meeting the volume of the leg portions 4 and the volume corresponding to the burrs 20. Similarly, the thickness of the sheet 23 that is to form the regions 6 suffices to be set to a thickness sufficiently meeting the volume of the regions 6 and the volume corresponding to the burrs 31. Further, the thickness of the sheet 25 that is to form the regions 8 suffices to be set to a thickness sufficiently meeting the volume of the regions 8 and the volume corresponding to the burrs 31.

However, if deviation occurs in the balance, etc., of the respective sheets of 14, 23, and 25, a molding defect, for example, such that the butyl based rubber becomes exposed at a liquid contacting portion at the lower surface side of the medical rubber closure 1 due to the molding pressure and the required oil resistance cannot be obtained, may occur.

Although as a countermeasure for the above, attention must obviously be paid to the balance of the respective sheets 14, 23, and 25, it is further preferable to make the sheets 14 and 23 of the nitrile based rubber harder than the sheet 25 of the butyl based rubber to prevent the butyl based rubber from reaching the liquid contacting portion at the lower surface side of the medical rubber closure 1 during vulcanization molding.

Also, as the sheets 14 and 23 of the nitrile based rubber and as the sheet 25 of the butyl based rubber, it is effective to combine and use those of two colors of extremely high color difference such that the color difference value dE* with respect to each other as expressed in NBS units is 6.0 to 12.0 or those of two colors of different color systems such that the color difference value dE* is 12.0 or higher.

With this arrangement, when the molding defect such that the butyl based rubber becomes exposed at the liquid contacting portion at the lower surface side of the medical rubber closure 1 occurs as mentioned above, the molding defect can be discovered reliably and readily by the appearance inspection and eliminated from the product to thereby reduce the defect rate.

To make the sheets 14 and 23 of the nitrile based rubber and the sheet 25 of the butyl based rubber differ in color, a colorant meeting the color difference value dE* is blended in just one of either or different colorants meeting the color difference value dE* are blended in both.

EXAMPLES

Example 1

By the manufacturing method described above, a medical rubber closure 1, which is for a container of 5 ml vial volume, has the shape shown in FIG. 1A and FIG. 1B, and with which a leg portion 4 and a region 6 of a flange portion 2 at a lower surface 3 side are made of NBR, a region 8 of the flange portion 2 at a top surface 7 side is made of IIR, all surfaces of the leg portion 4 are laminated with a coating layer 13 made of an ETFE film, the diameter of the flange portion 2 is 14.5 mm, and the diameter of the leg portion 4 is 9.7 mm, was manufactured.

Comparative Example 1

Besides the region 8 of the flange portion 2 at the top surface 7 side being formed of the same NBR as the leg portion 4 and the region 6, a medical rubber closure 1 of the same shape and same dimensions was manufactured in the same manner as in Example 1.

Comparative Example 2

Besides not coating the leg portion 4 with the coating layer 13, a medical rubber closure 1 of the same shape and same dimensions was manufactured in the same manner as in Example 1.

Comparative Example 3

Besides the leg portion 4 and the region 6 of the flange portion 2 at the lower surface 3 side being formed of the same IIR as the region 8, a medical rubber closure 1 of the same shape and same dimensions was manufactured in the same manner as in Example 1.

<Extractable Substances Test>

With the medical rubber closures manufactured in the Example and Comparative Examples, the "Extractable Substances Test" cited in "7.03 Test for Rubber Closure for Aqueous Infusions" of the Japanese Pharmacopoeia Sixteenth Edition was performed. The conformity conditions were set as follows.

Properties of test solution: Clear and colorless.

UV transmittance: Transmittance at each of 430 nm and 650 nm wavelengths is not less than 99.0%.

UV absorption spectrum: Absorbance at wavelengths of 250 nm to 350 nm is not more than 0.20.

Foaming: Disappears within 3 minutes.

pH: Difference of pH between the test solution and a blank solution is not more than ±1.0.

Zinc: Not more than 1 μg/ml.

Potassium permanganate reducing substances: Not more than 2.0 ml/100 ml.

Residue on evaporation: Not more than 2.0 mg.

<Oil Resistance Test>

Mineral oil was placed in vial bottles, and in a state of being fitted with the medical rubber closures, manufactured in the Example and the Comparative Examples and weighed precisely in advance, and seamed with aluminum caps, the vial bottles were inverted to attain a liquid contacting state, and after setting still for 1 month under a temperature of 40° C., cleaning with an ethanol-based mixed solvent and air drying were performed and then precise weighing was performed again to determine weight change rates and the oil resistance was evaluated according to the following standards.

◯: The weight change rate was not more than 5%. No swelling occurred. Oil resistance is satisfactory.

x: The weight change rate exceeded 5%. Swelling occurred. Oil resistance is poor.

<Moisture Permeation Resistance Test>

Approximately 0.5 g of silica gel were placed in vial bottles, and in a state of being fitted with the medical rubber closures, manufactured in the Example and the Comparative Examples, and seamed with aluminum caps, 90 days were made to elapse under an environment of a temperature of 40° C. and a relative humidity of 75%, and thereafter weight change amounts of the silica gel were measured and the moisture permeation resistance was evaluated according to the following standards.

◯: The weight change amount was not more than 5 mg. Moisture permeation resistance is satisfactory.

x: The weight change amount exceeded 5 mg. Moisture permeation resistance is poor.

The results of the above are shown in Table 1.

TABLE 1

| | | Example 1 | Comparative Example 1 | Comparative Example 2 | Comparative Example 3 |
|---|---|---|---|---|---|
| Arrangement | Region 8 | IIR | NBR | IIR | IIR |
| | Region 6 + leg portion 4 | NBR | NBR | NBR | IIR |
| | Coating layer 13 | Applicable | Applicable | Not applicable | Not applicable |
| Evaluation | Extractable substances test | Conformity | Nonconformity | Nonconformity | Conformity |
| | Oil resistance test | ◯ | ◯ | ◯ | x |
| | Moisture permeation resistance test | ◯ | x | ◯ | ◯ |

From the results of Comparative Example 1 in Table 1, it was found that if the entirety of the medical rubber closure 1, that is, the leg portion 4, the region 6 at the lower surface 3 side of the flange portion 2, and the region 8 at the top surface 7 side of the flange portion 2 are all formed of NBR, the extractable substances test results in nonconformity and the moisture permeation resistance is poor.

Also, from the results of Comparative Example 3, it was found that if the respective portions are formed of IIR, the oil resistance is poor.

Further from the results of Comparative Example 2, it was found that although both the moisture permeation resistance and the oil resistance can be made satisfactory if the leg portion 4 and the region 6 are formed of NBR and the region 8 is formed of IIR, if the leg portion 4 is not coated with the coating layer 13, the extractable substances test results in nonconformity.

On the other hand, from the results of Example 1, it was found that if the leg portion 4 and the region 6 are formed of NBR, the region 8 is formed of IIR, and leg portion 4 is coated with the coating layer 13, the medical rubber closure 1, which is satisfactory in both the moisture permeation resistance and the oil resistance and conforms to the extractable substances test can be obtained.

The invention claimed is:

1. A method for manufacturing medical rubber closure comprising a disc-shaped flange portion and a leg portion formed to be continuous to a lower surface side of the flange portion, wherein a region at the lower surface side of the flange portion and the leg portion are made of a nitrile based rubber, a region at a top surface side of the flange portion is made of a butyl based rubber, and the leg portion is laminated with a coating layer made of a fluorine based resin film, said method comprising:

a step of vulcanization molding a sheet of unvulcanized nitrile based rubber that is to form the leg portion and a fluorine based resin film that is to form the coating layer to form a primary molded article, including the leg portion made of the nitrile based rubber and the coating layer made of the fluorine based resin film and being laminated to the leg portion by vulcanization bonding, and thereafter punching out the leg portion individually to prepare a closure blank, and a step of setting the closure blank in a secondary molding mold, overlapping thereon a sheet of unvulcanized nitrile based rubber that is to form the region at the lower surface side of the flange portion and a sheet of unvulcanized butyl based rubber that is to form the region at the top surface side of the flange portion, and performing vulcanization molding in this state to form the region at the lower surface side of the flange portion made of the nitrile based rubber and the region at the top surface side of the flange portion made of the butyl based rubber and vulcanization bonding the two regions and the closure blank to each other.

2. The method for manufacturing medical rubber closure according to claim 1, wherein the sheet of unvulcanized nitrile based rubber that is to form the region at the lower surface side of the flange portion and the sheet of unvulcanized butyl based rubber that is to form the region at the top surface side of the flange portion are vulcanization-molded together with the closure blank in a state of being overlapped via a sheet of ultrahigh molecular weight polyethylene.

3. The method for manufacturing medical rubber closure according to claim 2, wherein the sheet of ultrahigh molecular weight polyethylene has a thickness of not less than 25 μm and not more than 200 μm.

4. The method for manufacturing medical rubber closure according to claim 1, wherein as the sheets of nitrile based rubber and the sheet of butyl based rubber, those of two colors of extremely high color difference such that the color difference value dE* with respect to each other as expressed in NBS units is 6.0 to 12.0 or those of two colors of different color systems such that the color difference value dE* is 12.0 or higher are combined and used.

* * * * *